United States Patent
Xie et al.

(10) Patent No.: US 10,604,413 B2
(45) Date of Patent: Mar. 31, 2020

(54) **SYNTHESIS OF *MRE FRAMEWORK TYPE MOLECULAR SIEVES**

(71) Applicant: Chevron U.S.A. Inc., San Ramon, CA (US)

(72) Inventors: Dan Xie, Richmond, CA (US); Adeola Florence Ojo, Pleasant Hill, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/200,729

(22) Filed: Nov. 27, 2018

(65) Prior Publication Data

US 2019/0276323 A1 Sep. 12, 2019

Related U.S. Application Data

(60) Provisional application No. 62/640,622, filed on Mar. 9, 2018.

(51) Int. Cl.
| | | |
|---|---|---|
| *C01B 39/48* | (2006.01) | |
| *B01J 29/70* | (2006.01) | |
| *B01J 29/86* | (2006.01) | |
| *C01B 39/02* | (2006.01) | |
| *C01B 39/12* | (2006.01) | |
| *C01B 37/02* | (2006.01) | |

(52) U.S. Cl.
CPC ............. *C01B 39/48* (2013.01); *B01J 29/703* (2013.01); *B01J 29/86* (2013.01); *C01B 37/02* (2013.01); *C01B 39/026* (2013.01); *C01B 39/12* (2013.01); *C01P 2002/72* (2013.01); *C01P 2004/03* (2013.01)

(58) Field of Classification Search
CPC ........ C01B 39/48; C01B 39/12; B01J 29/703; B01J 29/86
See application file for complete search history.

(56) References Cited

U.S. PATENT DOCUMENTS

| | | | | |
|---|---|---|---|---|
| 4,254,231 A | * | 3/1981 | Flowers | ............. C08G 18/4063 525/58 |
| 4,397,827 A | | 8/1983 | Chu | |

(Continued)

FOREIGN PATENT DOCUMENTS

| | | |
|---|---|---|
| EP | 0046504 | 3/1982 |
| EP | 0142317 | 5/1985 |

OTHER PUBLICATIONS

PCT International Search Report, International Patent Appl. No. PCT/IB2018/059324, dated Feb. 12, 2019.

(Continued)

*Primary Examiner* — David M Brunsman

(57) ABSTRACT

A molecular sieve of *MRE framework can be synthesized using one or more of (2-hydroxyethyl)trimethylammonium cations, (2-hydroxpropyl)trimethylammonium cations, propyltrimethylammonium cations, and benzyltrimethylammonium cations as a structure directing agent.

10 Claims, 2 Drawing Sheets

(56) References Cited

U.S. PATENT DOCUMENTS

| | | | |
|---|---|---|---|
| 4,423,021 | A | 12/1983 | Rollmann et al. |
| 4,448,675 | A | 5/1984 | Chu |
| 4,585,637 | A * | 4/1986 | Rubin ................ B01J 29/7034 |
| | | | 423/706 |
| 4,585,747 | A | 4/1986 | Valyocsik |
| 4,689,207 | A * | 8/1987 | Zones ................ C01B 33/38 |
| | | | 423/332 |
| 5,075,269 | A | 12/1991 | Degnan et al. |
| 5,098,685 | A | 3/1992 | Casci et al. |
| 5,374,410 | A * | 12/1994 | Grasselli ................ B01D 53/02 |
| | | | 208/120.01 |
| 5,961,951 | A | 10/1999 | Kennedy et al. |
| 6,042,807 | A * | 3/2000 | Faraj ................ B01J 29/04 |
| | | | 423/326 |
| 7,544,347 | B2 | 6/2009 | Hastoy et al. |
| 7,622,099 | B2 | 11/2009 | Caullet et al. |
| 7,771,703 | B2 | 8/2010 | Guillon et al. |
| 8,003,074 | B2 | 8/2011 | Lai et al. |
| 9,802,830 | B2 | 10/2017 | Ojo et al. |
| 2010/0179361 | A1 * | 7/2010 | Goergen ................ B01J 29/06 |
| | | | 585/481 |
| 2011/0105302 | A1 | 5/2011 | Burton |

OTHER PUBLICATIONS

A. Tuel and Y.B. Taarit "A new template for the synthesis of titanium silicalites with the ZSM-48 structure" Zeolites, 1995, 15, 164-170.

T. Moteki, S.H. Keoh, T. Ohmura, K. Iyoki, T. Wakihara and T. Okubo "Synthesis of pure-silica ZSM-48 zeolite under mild hydrothermal condition with conventional amphiphilic cation by tuning the reactant gel composition" J. Ceram. Soc. Jpn. 2013, 121, 575-577.

A. Araya and B.M. Lowe "Zeolite Synthesis in the NH2(CH2)6NH2—Al2O3—SiO2—H2O System at 180oC" J. Catal. 1984, 85, 135-142.

J.L. Schlenker, W.J. Rohrbaugh, P. Chu, E.W. Valyocsik and G.T. Kokotailo "The framework topology of ZSM-48 A high silica zeolite" Zeolites, 1985, 5, 355-358.

R.F. Lobo and H. Van Koningsveld "New Description of the Disorder in Zeolite ZSM-48" J. Am. Chem. Soc. 2002, 124, 13222-13230.

C.E. Kirschhock, D. Liang, G. Van Tendeloo, A. Fecant, G. Hastoye, G. Vanbutsele, N. Bats, E. Guillon and J.A. Martens "Ordered End-Member of ZSM-48 Zeolite Family" Chem. Mater. 2009, 21, 371-380.

* cited by examiner

US 10,604,413 B2

SYNTHESIS OF *MRE FRAMEWORK TYPE MOLECULAR SIEVES

CROSS-REFERENCE TO RELATED APPLICATIONS

This application claims priority to and the benefit of U.S. Provisional Application Ser. No. 62/640,622, filed Mar. 9, 2018.

FIELD

This disclosure relates to the synthesis of molecular sieves of *MRE framework type.

BACKGROUND

Zeolitic materials are known to have utility as sorbents and to have catalytic properties for various types of hydrocarbon conversion reactions. Certain zeolitic materials are ordered, porous crystalline materials having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

One type of zeolite structure used for catalytic processing of petroleum streams is ZSM-48, a disordered high-silica zeolite with one dimensional 10-ring channels. U.S. Pat. No. 4,397,827 discloses ZSM-48 and its preparation using a mixture of a $C_2$-$C_{12}$ alkylamine and a tetramethylammonium compound.

R. F. Lobo et al. (*J. Am. Chem. Soc.* 2002, 124, 13222-13230) reported that ZSM-48 is not a code for one material but for a family of materials with different degrees of disorder. The framework structure of ZSM-48 has been assigned the three-letter code *MRE by the Structure Commission of the International Zeolite Association. Other materials of the *MRE framework type include COK-8 (described in *Chem. Mater.* 2009, 21, 371-380), EU-2 (described in U.S. Pat. No. 5,098,685), EU-11 (described in *J. Catal.* 1984, 85, 135-142), IZM-1 (described in U.S. Pat. No. 7,771,703), SSZ-91 (described in U.S. Pat. No. 9,802,830) and ZBM-30 (described in European Patent Application No. 0046504).

A number of organic compounds have been shown to direct the synthesis of *MRE framework type molecular sieves including organic linear amine and polyamine compounds, diquaternary alkyl ammonium compounds and glycols.

According to the present disclosure, it has now been found that (2-hydroxyethyl)trimethylammonium cations, (2-hydroxypropyl)trimethylammonium cations, propyltrimethylammonium cations, and benzyltrimethylammonium cations are effective as structure directing agents in the synthesis of *MRE framework type molecular sieves.

SUMMARY

In one aspect, there is provided a method of synthesizing a molecular sieve of *MRE framework type, the method comprising: (a) providing a reaction mixture comprising: (1) a source of silicon oxide; (2) optionally, a source of an oxide of a trivalent element (X); (3) optionally, a source of a Group 1 or Group 2 metal (M); (4) a structure directing agent (Q) comprising one or more of (2-hydroxyethyl)trimethylammonium cations, (2-hydroxypropyl)trimethylammonium cations, propyltrimethylammonium cations, and benzyltrimethylammonium cations; (5) a source of hydroxide ions; and (6) water; and (b) subjecting the reaction mixture to crystallization conditions sufficient to form crystals of the molecular sieve.

In another aspect, there is provided a molecular sieve of *MRE framework type and, in its as-synthesized form, comprising one or more of (2-hydroxyethyl)trimethylammonium cations, (2-hydroxypropyl)trimethylammonium cations, propyltrimethylammonium cations, and benzyltrimethylammonium cations in its pores.

DETAILED DESCRIPTION

Introduction

Figure 1:
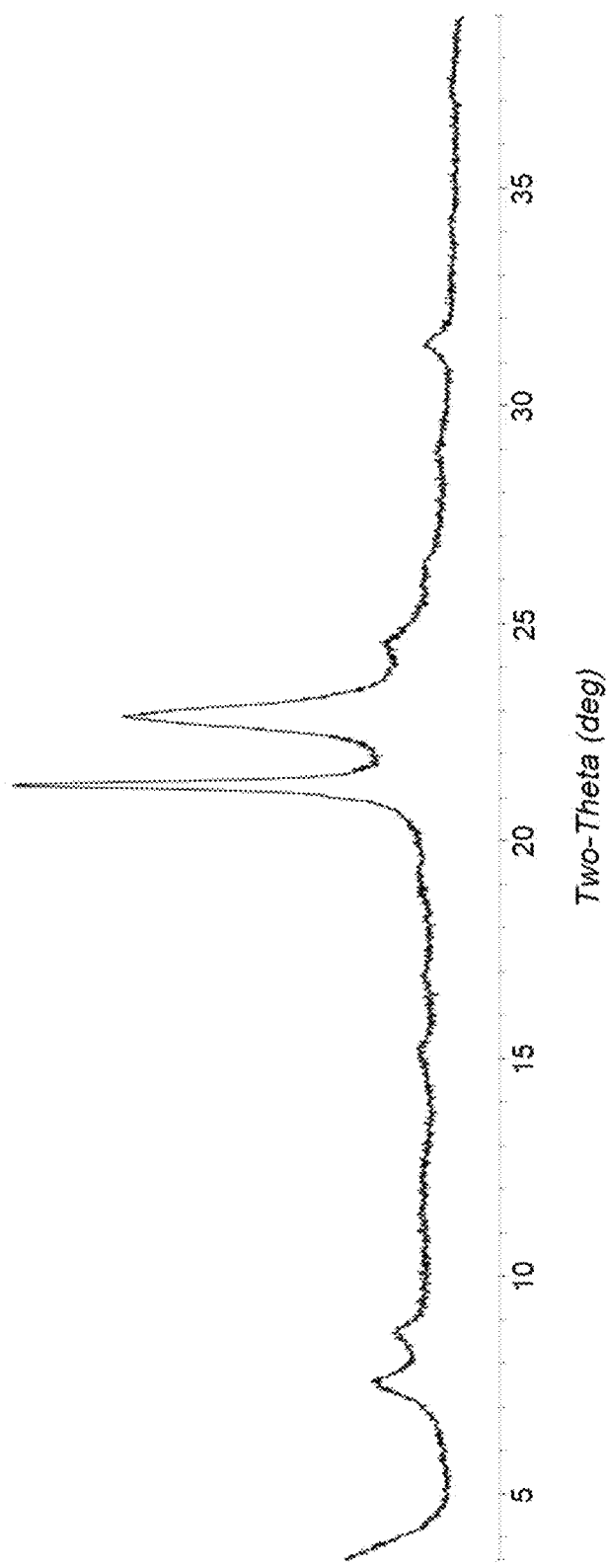
FIG. 1 is a powder X-ray diffraction (XRD) pattern of the as-synthesized molecular sieve prepared in Example 1.

The term "framework type" is used in the sense described in the "*Atlas of Zeolite Framework Types,*" Sixth Revised Edition, Elsevier, 2007.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, a molecular sieve of *MRE framework type may be synthesized by: (a) providing a reaction mixture comprising (1) a source of silicon oxide; (2) optionally, a source of an oxide of a trivalent element (X); (3) optionally, a source of a Group 1 or Group 2 metal (M); (4) a structure directing agent (Q) comprising one or more of (2-hydroxyethyl)trimethylammonium cations, (2-hydroxpropyl)trimethylammonium cations, propyltrimethylammonium cations, and benzyltrimethylammonium cations; (5) a source of hydroxide ions; and (6) water; and (b) subjecting the reaction mixture to crystallization conditions sufficient to form crystals of the molecular sieve.

The reaction mixture may have a composition, in terms of molar ratios, within the following ranges:

| Reactants | Useful | Exemplary |
| --- | --- | --- |
| $SiO_2/X_2O_3$ | ≥80 | 150 to 500 |
| $M/SiO_2$ | 0 to 0.50 | 0 to 0.20 |
| $Q/SiO_2$ | 0.05 to 0.50 | 0.15 to 0.40 |
| $OH/SiO_2$ | 0.10 to 1.00 | 0.15 to 0.50 |
| $H_2O/SiO_2$ | 10 to 60 | 15 to 40 | wherein compositional variables X, M and Q are as described herein above.

Suitable sources of silicon oxide include fumed silica, colloidal silica, precipitated silica, alkali metal silicates and tetraalkyl orthosilicates.

If present, suitable sources of trivalent element X can depend on the element X that is selected (e.g., one or more of B, Al, Ga, and Fe). Where X comprises or is boron, suitable sources of boron include boric acid and water-soluble boron salts (e.g., sodium tetraborate and potassium borate). Combined sources of silicon oxide and boron oxide can additionally or alternatively be used and can include borosilicate zeolites (e.g., boron beta zeolite). Where X comprises or is aluminum, suitable sources of aluminum include hydrated alumina and water-soluble aluminum salts (e.g., aluminum nitrate). Combined sources of silicon oxide and aluminum oxide can additionally or alternatively be used and can include aluminosilicate zeolites (e.g., zeolite Y) and clays or treated clays (e.g., metakaolin).

If present, suitable Group 1 or Group 2 metals include sodium, potassium and calcium. The metal is generally present in the reaction mixture as the hydroxide.

The structure directing agent (Q) comprises one or more of (2-hydroxyethyl)trimethylammonium cations, (2-hydroxypropyl)trimethylammonium cations, propyltrimethylammonium cations and benzyltrimethylammonium cations, represented by the following structures (1), (2), (3) and (4), respectively:

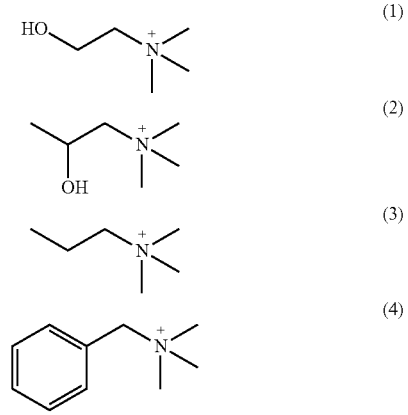

Suitable sources of Q are the hydroxides and/or other salts of the relevant quaternary ammonium compounds.

The reaction mixture may also contain seeds of a molecular sieve material, such as ZSM-48, desirably in an amount of from 0.01 to 10,000 ppm by weight (e.g., from 100 to 5000 ppm by weight) of the reaction mixture. Seeding can be advantageous in decreasing the time necessary for complete crystallization to occur. In addition, seeding can lead to an increased purity of the product obtained by promoting the nucleation and/or formation of the desired molecular sieve over any undesired phases.

For each embodiment described herein, reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 3 to 25 days. Crystallization is usually carried out in a closed system under autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

To the extent desired and depending on the $SiO_2/X_2O_3$ molar ratio of the material, any cations in the as-synthesized molecular sieve can be replaced in accordance with techniques well known in the art by ion exchange with other cations. Replacing cations can include metal ions, hydrogen ions, hydrogen precursor ions (e.g., ammonium ions), and combinations thereof. Particularly preferred replacing cations include those which tailor the catalytic activity for certain hydrocarbon conversion reactions. These can include hydrogen, rare earth metals, and metals of Groups 2 to 15 of the Periodic Table of the Elements.

The as-synthesized molecular sieve may be subjected to subsequent treatment to remove part or all of the structure directing agent (Q) used in its synthesis. This can be conveniently effected by thermal treatment (calcination) in which the as-synthesized material can be heated at a temperature of at least about 370° C. for at least 1 minute and generally not longer than about 24 hours. The thermal treatment can be performed at a temperature up to about 925° C. While sub-atmospheric and/or super-atmospheric pressures can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

Characterization of the Molecular Sieve

In its as-synthesized and anhydrous form, the present molecular sieve may have a chemical composition comprising the following molar relationship:

| | Broad | Exemplary |
| --- | --- | --- |
| $SiO_2/X_2O_3$ | ≥80 | ≥100 |
| $Q/SiO_2$ | >0 to 0.1 | >0 to 0.1 |
| $M/SiO_2$ | 0 to 0.1 | 0 to 0.1 | wherein compositional variables X, Q and M are as described herein above. It will be appreciated from the permitted values for the $SiO_2/X_2O_3$ molar ratio that the present molecular sieve can be synthesized in a totally siliceous form (i.e., "all-silica" form) in which an oxide of a trivalent element (X) is absent or essentially absent.

In some embodiments, the present molecular sieve comprises at least one of COK-8, EU-2, EU-11, IZM-1, SSZ-91, ZBM-30, and ZSM-48.

The present molecular sieve may be substantially free of non-*MRE materials. The term "substantially free of non-*MRE materials" used herein means that the present molecular sieve preferably contains 3.5 wt. % or less (e.g., 0 to 3.5 wt. %, 2 wt. % or less, 1 wt. % or less, or no detectable amount by XRD) of such impurities, which weight percent (wt. %) values are based on the combined weight of impurities and pure phase *MRE materials. Examples of non-*MRE materials include amorphous material, kenyaite, magadiite, EU-1, and ZSM-50.

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

36.27 g of deionized water, 6.34 g of a 48-50% (2-hydroxyethyl)trimethylammonium hydroxide solution (TCI America), 0.15 g of a 50% aluminum hydroxide solution (Barcroft™ 0250 aluminum hydroxide, SPI Pharma) and 11.00 g of LUDOX® AS-40 colloidal silica were mixed together in a Teflon liner. The resulting gel was stirred extensively until it became homogeneous. The liner was then capped and placed within a Parr Steel autoclave reactor. The autoclave was then put in an oven heated at 170° C. for 14 days with tumbling (43 rpm). The solid products were recovered from the cooled reactor by centrifugation, washed with deionized water and dried at 95° C.

Figure 2:
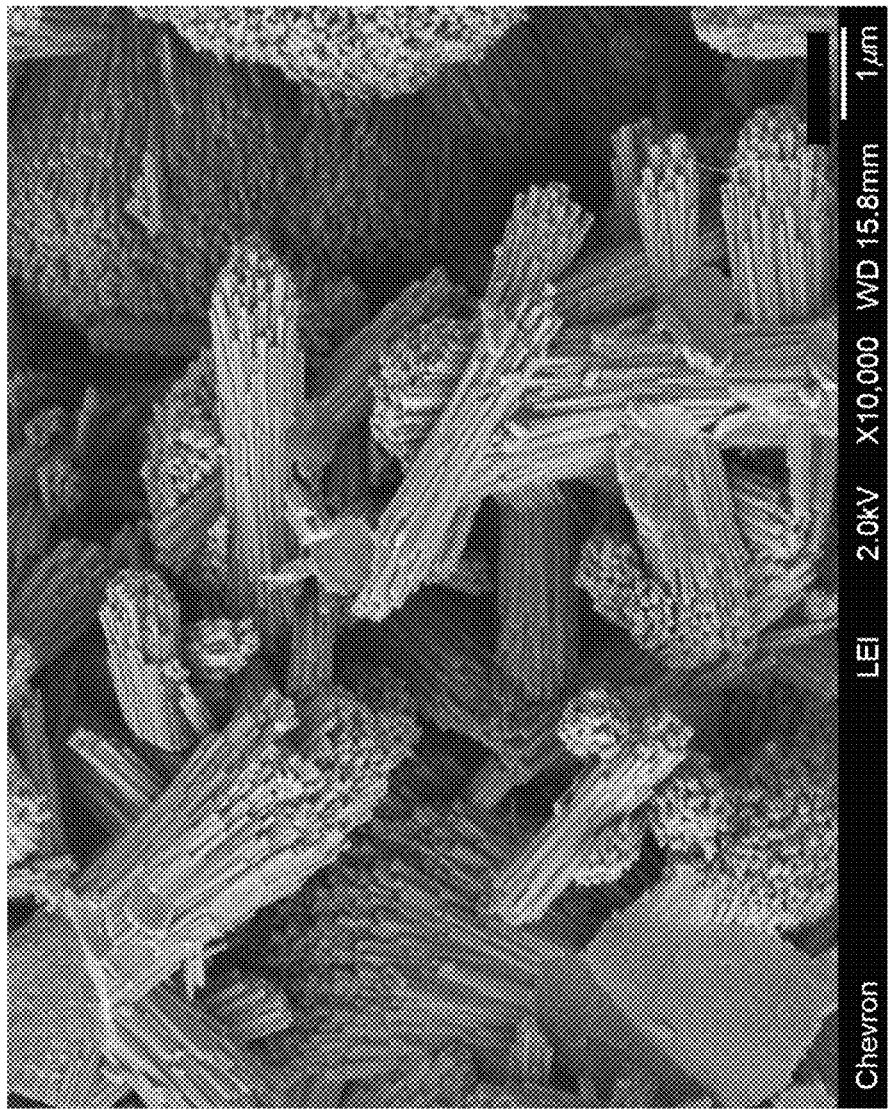
FIG. 2 is a Scanning Electron Micrograph (SEM) image of the as-synthesized molecular sieve prepared in Example 1.

The powder XRD pattern of the as-synthesized material is shown in FIG. 1 and exhibits the typical pure phase of ZSM-48 topology. FIG. 2 is a SEM of the as-synthesized material and indicates a uniform field of crystals.

The resulting ZSM-48 product had a SiO$_2$/Al$_2$O$_3$ molar ratio of 96.6, as determined by Inductively Coupled Plasma-Mass Spectrometry (ICP-MS).

Example 2

4.96 g of deionized water, 0.86 g of a 48-50% (2-hydroxyethyl)trimethylammonium hydroxide solution (TCI America) and 1.50 g of LUDOX® AS-40 colloidal silica were mixed together in a Teflon liner. The resulting gel was stirred until it became homogeneous. The liner was then capped and placed within a Parr Steel autoclave reactor. The autoclave was then put in an oven heated at 170° C. for 8 days with tumbling (43 rpm). The solid products were recovered from the cooled reactor by centrifugation, washed with deionized water and dried at 95° C.

The powder XRD pattern of the as-synthesized material showed the typical pure phase of ZSM-48 topology.

Example 3

3.45 g of deionized water, 0.60 g of a 48-50% (2-hydroxyethyl)trimethylammonium hydroxide solution (TCI America), 0.03 g of CBV600 Y-zeolite powder (Zeolyst International, SiO$_2$/Al$_2$O$_3$ molar ratio=5.1) and 0.98 g of LUDOX® AS-40 colloidal silica were mixed together in a Teflon liner. The resulting gel was stirred until it became homogeneous. The liner was then capped and placed within a Parr Steel autoclave reactor. The autoclave was then put in an oven heated at 170° C. for 12 days with tumbling (43 rpm). The solid products were recovered from the cooled reactor by centrifugation, washed with deionized water and dried at 95° C.

The powder XRD pattern of the as-synthesized material showed the typical pure phase of ZSM-48 topology.

The resulting ZSM-48 product had a SiO$_2$/Al$_2$O$_3$ molar ratio of 91.2, as determined by ICP-MS.

Example 4

3.15 g of deionized water, 1.01 g of a 40% benzyltrimethylammonium hydroxide solution (Sigma-Aldrich), 0.03 g of CBV600 Y-zeolite powder (Zeolyst International, SiO$_2$/Al$_2$O$_3$ molar ratio=5.1) and 0.98 g of LUDOX® AS-40 colloidal silica were mixed together in a Teflon liner. The resulting gel was stirred until it became homogeneous. The liner was then capped and placed within a Parr Steel autoclave reactor. The autoclave was then put in an oven heated at 170° C. for 12 days with tumbling (43 rpm). The solid products were recovered from the cooled reactor by centrifugation, washed with deionized water and dried at 95° C.

The powder XRD pattern of the as-synthesized material showed the typical pure phase of ZSM-48 topology together with a minor amount of amorphous material.

Example 5

2.77 g of deionized water, 3.08 g of a 15.30% (2-hydroxypropyl)trimethylammonium hydroxide solution, 0.01 g of a 50% aluminum hydroxide solution (Barcroft™ 0250 aluminum hydroxide, SPI Pharma) and 1.50 g of LUDOX® AS-40 colloidal silica were mixed together in a Teflon liner. The resulting gel was stirred extensively until it became homogeneous. The liner was then capped and placed within a Parr Steel autoclave reactor. The autoclave was then put in an oven heated at 170° C. for 10 days with tumbling (43 rpm). The solid products were recovered from the cooled reactor by centrifugation, washed with deionized water and dried at 95° C.

The powder XRD pattern of the as-synthesized material showed the typical pure phase of ZSM-48 topology.

The resulting ZSM-48 product had a SiO$_2$/Al$_2$O$_3$ molar ratio of 137.6, as determined by ICP-MS.

Example 6

4.41 g of deionized water, 0.16 g of a 45% KOH solution, 1.99 g of a 18.69% propyltrimethylammonium hydroxide solution, 0.01 g of a 50% aluminum hydroxide solution (Barcroft™ 0250 aluminum hydroxide, SPI Pharma) and 2.50 g of LUDOX® AS-40 colloidal silica were mixed together in a Teflon liner. The resulting gel was stirred extensively until it became homogeneous. The liner was then capped and placed within a Parr Steel autoclave reactor. The autoclave was then put in an oven heated at 150° C. for 8 days with tumbling (43 rpm). The solid products were recovered from the cooled reactor by centrifugation, washed with deionized water and dried at 95° C.

The powder XRD pattern of the as-synthesized material showed the typical pure phase of ZSM-48 topology.

The resulting ZSM-48 product had a $SiO_2/Al_2O_3$ molar ratio of 172.4, as determined by ICP-MS.

Example 7

4.35 g of deionized water, 0.07 g of a 50% NaOH solution, 1.06 g of a 18.69% propyltrimethylammonium hydroxide solution, 0.005 g of boric acid and 0.50 g of CAB-O-SIL® M-5 fumed silica (Cabot Corporation) were mixed together in a Teflon liner. The resulting gel was stirred extensively until it became homogeneous. The liner was then capped and placed within a Parr Steel autoclave reactor. The autoclave was then put in an oven heated at 160° C. for 7 days with tumbling (43 rpm). The solid products were recovered from the cooled reactor by centrifugation, washed with deionized water and dried at 95° C.

The powder XRD pattern of the as-synthesized material showed the typical pure phase of ZSM-48 topology.

Example 8

The as-synthesized product of Example 1 was calcined inside a muffle furnace under a flow of air heated to 595° C. at a rate of 1° C./minute and held at 595° C. for 5 hours, cooled and then analyzed by powder XRD. The powder XRD pattern indicated that the material remains stable after calcination to remove the organic SDA.

The product after drying was subjected to a micropore volume analysis using $N_2$ as adsorbate and via the B.E.T. method. The molecular sieve exhibited a micropore volume of 0.08 cm³/g.

The invention claimed is:

1. A method of synthesizing a molecular sieve of *MRE framework type, the method comprising:
   (a) providing a reaction mixture comprising:
      (1) a source of silicon oxide;
      (2) optionally, a source of an oxide of a trivalent element (X);
      (3) optionally, a source of a Group 1 or Group 2 metal (M);
      (4) a source of hydroxide ions;
      (5) a structure directing agent (Q) comprising one or more of (2-hydroxyethyl)trimethylammonium cations, (2-hydroxpropyl)trimethylammonium cations, and benzyltrimethylammonium cations; and
      (6) water; and
   (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/X_2O_3$ | ≥80 |
| $M/SiO_2$ | 0 to 0.50 |
| $Q/SiO_2$ | 0.05 to 0.50 |
| $OH/SiO_2$ | 0.10 to 1.00 |
| $H_2O/SiO_2$ | 10 to 60. |

3. The method of claim 1, wherein the reaction mixture has a composition, in terms of molar ratios, as follows:

| | |
|---|---|
| $SiO_2/X_2O_3$ | 150 to 500 |
| $M/SiO_2$ | 0 to 0.20 |
| $Q/SiO_2$ | 0.15 to 0.40 |
| $OH/SiO_2$ | 0.15 to 0.50 |
| $H_2O/SiO_2$ | 15 to 40. |

4. The method of claim 1, wherein the trivalent element X comprises boron.

5. The method of claim 1, wherein the trivalent element X comprises aluminum.

6. The method of claim 1, wherein the crystallization conditions include a temperature of from 125° C. to 200° C.

7. A molecular sieve of *MRE framework type, and in its as-synthesized form, comprising one or more of (2-hydroxyethyl)trimethylammonium cations, (2-hydroxpropyl)trimethylammonium cations, and benzyltrimethylammonium cations in its pores.

8. The molecular sieve of claim 7, and having a molar ratio of $SiO_2/X_2O_3$ of at least 80, wherein X is a trivalent element.

9. The molecular sieve of claim 8, wherein the trivalent element X comprises boron.

10. The molecular sieve of claim 8, wherein the trivalent element X comprises aluminum.

* * * * *